(12) United States Patent
Shen et al.

(10) Patent No.: US 10,509,223 B2
(45) Date of Patent: Dec. 17, 2019

(54) SYSTEM, METHOD AND COMPUTER PROGRAM PRODUCT FOR PHOTOMETRIC SYSTEM DESIGN AND ENVIRONMENTAL RUGGEDIZATION

(71) Applicant: Halliburton Energy Services, Inc., Houston, TX (US)

(72) Inventors: Jing Shen, Houston, TX (US); Christopher Michael Jones, Houston, TX (US); Dingding Chen, Plano, TX (US); Wei Zhang, Houston, TX (US); David L. Perkins, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 635 days.

(21) Appl. No.: 14/763,408

(22) PCT Filed: Mar. 5, 2013

(86) PCT No.: PCT/US2013/029111
§ 371 (c)(1),
(2) Date: Jul. 24, 2015

(87) PCT Pub. No.: WO2014/137322
PCT Pub. Date: Sep. 12, 2014

(65) Prior Publication Data
US 2015/0355459 A1 Dec. 10, 2015

(51) Int. Cl.
*G02B 27/00* (2006.01)
*G06N 3/12* (2006.01)
(Continued)

(52) U.S. Cl.
CPC ..... *G02B 27/0012* (2013.01); *G06K 9/00973* (2013.01); *G06K 9/74* (2013.01); *G06N 3/126* (2013.01); *G06K 9/6229* (2013.01)

(58) Field of Classification Search
CPC .. G02B 27/0012; G06K 9/74; G06K 9/00973; G06K 9/6229; G06N 3/126
See application file for complete search history.

(56) References Cited

U.S. PATENT DOCUMENTS 4,171,909 A 10/1979 Kramer et al.
6,341,257 B1 1/2002 Haaland
(Continued)

FOREIGN PATENT DOCUMENTS

JP 2001 249953 A 9/2001

OTHER PUBLICATIONS

M. J. Sousa, C. S. Sales, Junior, J. C. C. Carvalho, J. C. W. A. Costa, C. R. L. Francs and M. E. V. Segatto, "Optimization of Bragg Grating in Optical Fiber Using Modified Fitness Function and an Accelerated Genetic Algorithm", IEEE, ITS2006, pp. 249-252 (Year: 2006).*

(Continued)

*Primary Examiner* — Rehana Perveen
*Assistant Examiner* — Steven W Crabb
(74) *Attorney, Agent, or Firm* — Haynes and Boone, LLP (57) ABSTRACT

A photometric system design methodology employs genetic algorithms to optimize the selection of optical elements for inclusion in the photometric system in order to improve system performance with respect to environmental conditions (i.e., to "ruggedize" the photometric system). The genetic algorithms utilize a multi-objective fitness function to evolve simulated optical element selection, which may be a combination of optical filters and integrated computational elements. The system may also output a size reduced database that serve as simulated candidate optical elements through global optimization, or may output a fixed number of simulated optical elements through conditional optimization for actual tool implementation and calibration analysis.

14 Claims, 4 Drawing Sheets

(51) Int. Cl.
*G06K 9/74* (2006.01)
*G06K 9/00* (2006.01)
*G06K 9/62* (2006.01)

(56) References Cited

U.S. PATENT DOCUMENTS

| | | | |
|---|---|---|---|
| 6,711,503 | B2 | 3/2004 | Haaland |
| 6,734,963 | B2 | 5/2004 | Gamble et al. |
| 6,798,518 | B2 | 9/2004 | DiFoggio et al. |
| 6,856,856 | B1 | 2/2005 | Kolavennu et al. |
| 7,173,239 | B2 | 2/2007 | DiFoggio |
| 7,196,786 | B2 | 3/2007 | DiFoggio |
| 7,280,214 | B2 | 10/2007 | DiFoggio et al. |
| 7,299,136 | B2 | 11/2007 | DiFoggio et al. |
| 7,362,422 | B2 | 4/2008 | DiFoggio et al. |
| 7,408,645 | B2 | 8/2008 | DiFoggio |
| 7,609,380 | B2 | 10/2009 | Vannuffelen et al. |
| 7,671,983 | B2 | 3/2010 | Shammai et al. |
| 7,821,635 | B2 | 10/2010 | Pope et al. |
| 7,899,636 | B2 | 3/2011 | Bakker |
| 7,933,718 | B2 | 4/2011 | McDaniel et al. |
| 8,108,170 | B1 | 1/2012 | Shenk et al. |
| 8,164,050 | B2 | 4/2012 | Ford et al. |
| 2004/0102906 | A1 | 5/2004 | Roder |
| 2006/0044542 | A1 | 3/2006 | Park et al. |
| 2007/0288410 | A1 | 12/2007 | Tomkins et al. |
| 2009/0094005 | A1 | 4/2009 | Den Boef et al. |
| 2009/0307636 | A1* | 12/2009 | Cases ............... G06F 17/505 716/132 |
| 2009/0324101 | A1 | 12/2009 | Sung et al. |
| 2010/0321225 | A1 | 12/2010 | Hillis et al. |
| 2011/0231167 | A1 | 9/2011 | Cramer et al. |
| 2011/0257948 | A1 | 10/2011 | McDaniel et al. |
| 2013/0019673 | A1 | 1/2013 | Sroka et al. |

OTHER PUBLICATIONS

Jianjun Hu, et al., "Evolutionary Robust Design of Analog Filters Using Genetic Programming," chapter from book Evolutionary Computation in Dynamic and Uncertain Environments, pp. 479-496 (2007) (Year: 2007).*

International Search Report and The Written Opinion of the International Searching Authority, or the Declaration, dated May 23, 2013, PCT/US2013/029111, 8 pages, ISA/US.

Tarumi, et al., *Multivariate Calibration with Basis Functions Derived from Optical Filters*, Analytical Chemistry, vol. 81, No. 6, Mar. 15, 2009, pp. 2199-2207.

Supplementary European Search Report issued for EP 13876699 dated Oct. 18, 2016.

* cited by examiner

SYSTEM, METHOD AND COMPUTER PROGRAM PRODUCT FOR PHOTOMETRIC SYSTEM DESIGN AND ENVIRONMENTAL RUGGEDIZATION

The present application is a U.S. National Stage patent application of International Patent Application No. PCT/US2013/029111, filed on Mar. 5, 2013, the benefit of which is claimed and the disclosure of which is incorporated herein by reference in its entirety.

FIELD OF THE INVENTION

The present invention relates generally to designing photometric systems and, more specifically, to a system that utilizes genetic algorithms to optimize the design of an environmentally robust photometric system through computer simulation of candidate optical elements.

BACKGROUND

In recent years, optical computing techniques have been developed for applications in the Oil and Gas Industry in the form of optical sensors on downhole or surface equipment to evaluate a variety of fluid properties. An optical computing device, also referred to herein as photometric system, is a device configured to receive an input of electromagnetic radiation from a substance or sample of the substance and produce an output of electromagnetic radiation from a processing element, also referred to as an optical element. The optical element may be, for example, a narrow band optical filter or an Integrated Computational Element ("ICE") (also known as a Multivariate Optical Element ("MOE"). The design and operation of ICEs are described in, for example, U.S. Pat. Nos. 6,198,531; 6,529,276; and 8,049,881, each being owned by the Assignee of the present invention, Halliburton Energy Services, Inc., of Houston, Tex., the disclosure of each being hereby incorporated by reference in its entirety.

Fundamentally, optical computing devices utilize optical elements to perform calculations, as opposed to the hardwired circuits of conventional electronic processors. When light from a light source interacts with a substance, unique physical and chemical information about the substance is encoded in the electromagnetic radiation that is reflected from, transmitted through, or radiated from the sample. This information is often referred to as the substance's spectral "fingerprint." Thus, the optical computing devices, through use of the optical elements and multiple detectors, are capable of extracting the information of the spectral fingerprint of multiple characteristics or analytes within a substance and converting that information into detectable output signals reflecting the overall properties of a sample.

One objective of the photometric system design is to optimize optical element selection by adequately characterizing a specified number of analytes. The other objective is to determine the number of actual optical elements needed for system implementation. The first objective is typically a global optimization problem and is often a starting point of system design to evaluate the entire candidate domain for future implementation. The second objective is dependent on the constraints of the tool or instrument and, therefore, requires conditional optimization with a fixed number of elements to cost effectively meet the implementation specification. The photometric system design also includes optimization of other system components and optical path for signal to noise ratio ("SNR") and reliability enhancement.

Conventional photometric system design approaches are disadvantageous for a variety of reasons. In general, prior art approaches are closely related to the practice of variable selection in chemometrics. However, the existing software is designed for general purpose use, and does not automate global optimization and conditional optimization for specific application in photometric system design. The conventional software also has very limited functionality to relate selection optimization with environmental factors, such as, for example, the downhole environment in which the photometric system will be deployed. All components of the photometric system will experience downhole temperature variations from approximately 65° C. to 175° C. or higher, in addition to violent vibration during use. In addition, the spectroscopic cell will experience a pressure differential of up to 30,000 psi or higher. Therefore, the design optimization software should be capable of evaluating ruggedized designs to ensure sensor functionality and system reliability.

In view of the foregoing, there is a need in the art for a photometric system design optimization technique which environmentally ruggedizes the system while also possessing novel functionalities to provide integrated solutions.

DESCRIPTION OF ILLUSTRATIVE EMBODIMENTS

Illustrative embodiments and related methodologies of the present invention are described below as they might be employed in a method for photometric system design and environmental ruggedization. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Exemplary embodiments of the present invention are directed to design techniques for which a photometric system is optimized for performance with respect to environmental conditions and variations. As described herein, through the use of ray tracing software to understand the system limitations, and use of the variations of genetic algorithms to select the optical elements such as optical filters and ICEs, a photometric system is optimally designed to be environmentally robust and rugged, and is also functionally enhanced. The resulting photometric system may be utilized for a variety of applications such as, for example, to identify fluid types during well testing and sampling, and to determine the gas/oil ratio ("GOR") or other chemical or physiochemical properties of downhole samples through calibrated mathematical models or engineering functions.

In general, exemplary embodiments of the present invention described herein ruggedize a photometric system design as follows: The general configuration and major components of a photometric system are designed, characterized with respect to downhole environmental variables, and input into the optimization system. The optimization system characterizes the interactions of the photometric system components through a system response function or transfer function. A simulation model is then developed based upon the interaction of the photometric system components, the environmental effects and operational variables. Experimental data can then be collected on the high sensitivity parameters or poorly understood parameters of the simulation model. A fitness function is then developed to rank the performance of simulated optical elements within the simulation model. Here, Boolean operators or pass/fail criteria may also form part of the fitness function. A test bed or test dataset is developed in order to evaluate the fitness function. Finally, the optimization system employs genetic algorithms for feature selection of simulated optical elements with respect to the photometric system as simulated for operation in the defined environmental conditions, while also using the fitness function as the standard for optimization. Thereafter, the optimization system selects those simulated optical elements, from among an optical element database, that embody those selected features determined to optimize the photometric system in the defined environment. Alternatively, those selected features identified by the optimization system may be used as design specifications for fabricating an actual optical element. The actual optical elements comprising the selected features may then be integrated into a fabricated photometric system, thus ruggedizing the fabricated photometric system for the given environment.

Figure 1:
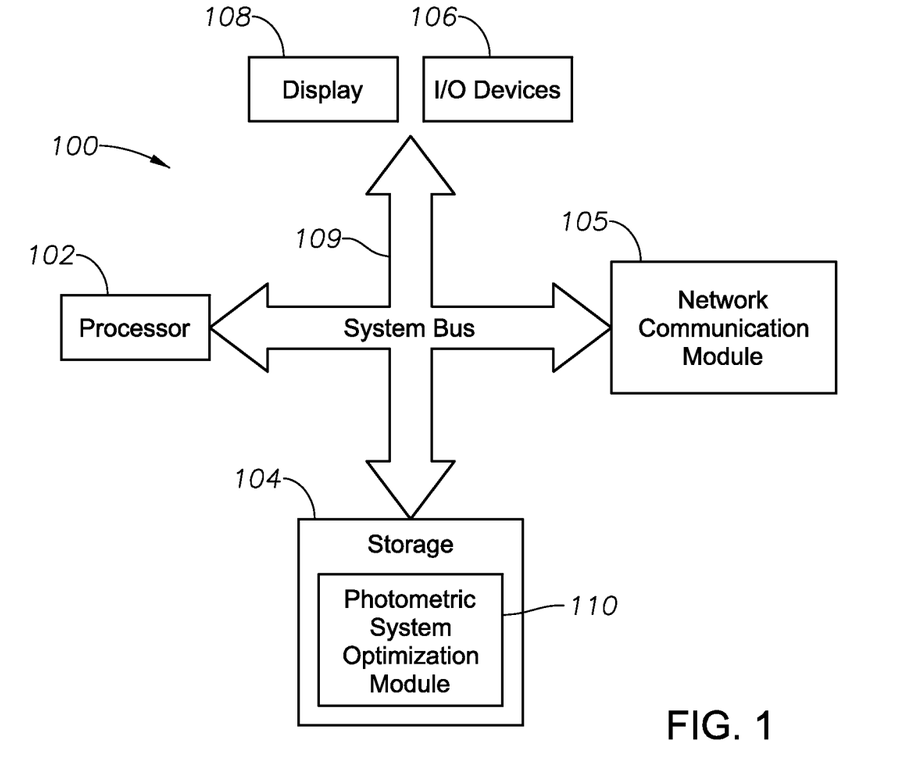
FIG. 1 illustrates a block diagram of a photometric design optimization system in accordance with certain exemplary embodiments of the present invention.

In view of the foregoing, FIG. 1 shows a block diagram of a photometric design optimization system according to an exemplary embodiment of the present invention. As will be described herein, photometric design optimization system 100 provides a platform to efficiently design a photometric system sufficiently rugged to withstand a defined downhole environment. In addition, the present invention may be utilized to evaluate the performance of the design. Exemplary embodiments of photometric design optimization system 100 described herein utilize a genetic algorithm as a search engine to evolve the selection of simulated optical elements for a given downhole system and environment based upon a fitness function. In each generation of the exemplary methodologies described herein, photometric design optimization system 100 updates a simulated population of optical elements that possesses less variation and exhibits better performance than the preceding group. In certain embodiments, the simulated optical elements in each generation may be ranked based upon their fitness function performance. Once the performance criteria are satisfied, the representative group may then be used directly for further fabricability study and/or optical element combination selection. In addition, the present invention provides well-organized and balanced optical system designs that enable efficient statistical analysis and feature characterization.

Referring to FIG. 1, photometric design optimization system 100 includes at least one processor 102, a non-transitory, computer-readable storage 104, transceiver/network communication module 105, optional I/O devices 106, and an optional display 108 (e.g., user interface), all interconnected via a system bus 109. In one embodiment, the network communication module 105 is a network interface card and communicates using the Ethernet protocol. In other embodiment, the network communication module 105 may be another type of communication interface such as a fiber optic interface and may communicate using a number of different communication protocols. Software instructions executable by the processor 102 for implementing software instructions stored within photometric system optimization module 110 in accordance with the exemplary embodiments described herein, may be stored in storage 104 or some other computer-readable medium.

Although not explicitly shown in FIG. 1, it will be recognized that photometric design optimization system 100 may be connected to one or more public (e.g., the Internet) and/or private networks via one or more appropriate network connections. It will also be recognized that the software instructions comprising photometric system optimization module 110 may also be loaded into storage 104 from a CD-ROM or other appropriate storage media via wired or wireless methods.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof in a computer system or other processing system.

Figure 2A:
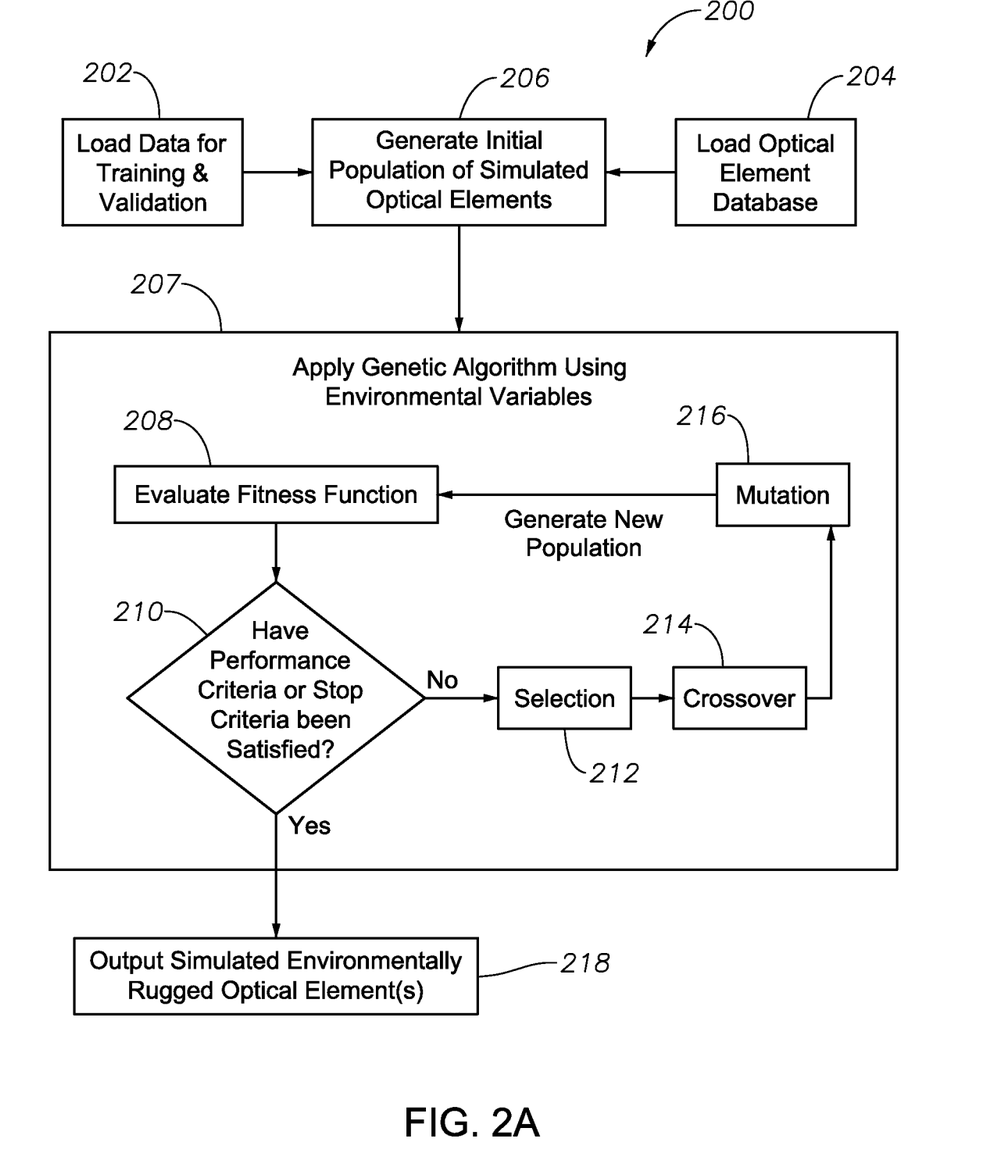
FIG. 2A is a flow chart detailing steps in an optimization process in which one or more environmentally rugged optical elements are selected using computer simulation, in accordance with certain exemplary embodiments of the present invention.

Referring to FIG. 2A, an exemplary methodology 200 of the present invention will now be described. As previously stated, exemplary embodiments of the present invention are directed to photometric system design techniques that utilize a genetic algorithm to select the best optical elements for a given downhole environment. In general, the exemplary methodologies described herein include generating a large matrix of simulated optical elements, treating the simulated optical elements to environmental variations (temperature, pressure or vibration, for example), and applying a genetic algorithm to determine optimal combinations of the simulated optical elements through utilization of a fitness function. In certain embodiments, the fitness function considers characteristics such as optimal analytical performance under environmental variation, lowest cost, and best manufacturability of the simulated optical elements.

As will be understood by those ordinarily skilled in the art having the benefit of this disclosure, a genetic algorithm is a stochastic global search engine that mimics the metaphor of natural biologic evolution. As a computational intelligent method, genetic algorithms operate on a population of potential solutions applying the principle of survival of the fittest to produce improved solutions through multiple generations. At each generation, the fitness of each individual element is evaluated based on a user-defined fitness function, and an updated population of solutions are created by using genetic operators such as ranking, selection, crossover and mutation. As utilized in exemplary embodiments of the present invention, this evolutionary computation approach eliminates the need to calculate the first derivative and/or the second derivative (as done in conventional optimization methods) and is suitable to solve complex problems such as those presented in photometric system design optimization.

Still referring to FIG. 2A, at block 202, calibration data for training and validation is uploaded into photometric design optimization system 100 via a user interface or some remote/local storage. Software instructions necessary to implement and display a graphical user interface are executed by processor 102 as would be understood by those ordinarily skilled in the art having the benefit of this disclosure. To begin this process, training data relating to the interaction of the components of the designed photometric system (in which the selected optical elements will form part) is entered into photometric design optimization system 100.

The training data further includes, for example, the spectra of thousands of oil runs on a micro-PVT (pressure-volume-temperature) system. Of these oils, visible and infrared spectra may be collected at three temperatures (for example, of 150° F., 200° F. and 250° F.), four pressures (for example, 6000 psi, 8000 psi and 12000 psi), and different dissolved methane concentrations. In addition, other spectra may be utilized, for example, related to oil concentration, water concentration, saturate concentration, aromatic concentration, resin concentration, asphaltene concentration, carbon dioxide concentration, hydrogen sulfide concentration and drilling fluid filtrate concentration.

Thus, photometric design optimization system 100 translates the experimentally measured oil samples into a series of expected tool responses as a function of temperature and pressure. As a result, the expected tool responses will multiplicatively augment the training set. In certain embodiments, the tool measurement points will include temperature and pressure combinations at about 150 F, about 200 F, about 250 F, about 300 F, about 350 F, and about 5000 psi, about 10000 psi, about 15000, and about 20000, and vibration will also be included as a separate cross section study. Moreover, in certain embodiments, cross sections at about, for example, 0, 0.05, 0.1, 0.2, 0.4, 0.8, and 1.6 deg rms jitter are monitored for completeness.

Still referring to block 202, certain exemplary embodiments of photometric design optimization system 100 will also add baseline noise as a function of temperature according to the detector specifications assuming a normal distribution for the noise equivalent power ("NEP"). In addition, photometric design optimization system 100 may also add a whole SNR to the detector signals for both the sample signal (oil, for example) and the reference signals (air, for example) by multiplying the sample signal by a SNR adjustment of 1800:1, for example, according to a normal distribution, and the reference signals by 6000:1.

In certain exemplary embodiments, the spectra of the fluid samples will then be convoluted with selected responses of the simulated optical elements, such as optical filters and ICEs, and other components of the optical system, such as bulb intensity and sapphire window, to form overall detector responses. The detector responses then may be used either directly or indirectly as, for example, multivariate PLS model inputs to predict the chemical and physical properties of the fluid samples. In one embodiment, the detector responses may be calculated as a ratio parameter of two channel responses as expressed in numerator of denominator, respectively, using the following:

$$OS(i) = \frac{(TrsIR \cdot * I_o \cdot * SapIR) \times NBF(i)}{(TrsIR \cdot * I_o \cdot * SapIR) \times NDF}, \quad \text{Eq. (1)}$$

where "·*" is an operator of multiplication element by element, "x" is an operator for matrix multiplication, (TrsIR) represents the transmittance spectroscopy of a measured with a standard Optical-PVT system, ($I_o$) represents the light (bulb) intensity of the tool instrument, and (SapIR) represents the sapphire window transmittance of a flow pipe or cell of the detector. Also, in this exemplary Equation (1), it is assumed that channel/band information is found important over the database and implemented into the detector with the use of a number of narrow band optical elements, represented as (NBF). In certain embodiments, the NBF can be replaced, or used in conjunction, with ICE for general system implementation. In addition, a broad band neutral density filter (NDF) is used to control the intensity profiles in illuminations and projection systems. Therefore, in this example, the sensor output may be expressed as a ratio (normalized by neutral density filter output) parameter for each optical channel. Accordingly, the resulting data, along with the chemical and physical property data of the samples, may be used as training examples for calibration modeling of photometric design optimization system 100.

However, in alternative embodiments, photometric design optimization system 100 may calculate the detector responses in domains such as, for example, transmittance or absorbance). Nevertheless, once photometric design optimization system 100 predicts the physical and chemical properties of the fluid sample, the resultant data is separated into sub-groups for training and validation. Photometric design optimization system 100 will then generate a population of simulated optical elements by selecting the candidate optical elements for inclusion in the initial element population (block 206) based upon the overall performance on the entire data set over multiple fluid properties using channel responses with the selected optical elements as inputs.

In order to model the aforementioned tool responses and their interactions within the designed photometric system, exemplary embodiments of the present invention utilize a ray tracing software module (not shown) as part of photometric system optimization module 110. An exemplary ray tracing platform may be, for example, the Zemax® ray tracing software, as would be understood by those ordinarily skilled in the art having the benefit of this disclosure. However, those ordinarily skilled in the art having the benefit of this disclosure will realize that other simulation platforms may be utilized.

As described herein, photometric design optimization system 100 utilizes the ray tracing software to model the optical system's response to changes in the index of refraction of the oil, variations in the cell path length as a function of temperature, pressure, and thermal effects on the optical components. In certain embodiments, the inputs to the ray tracing software module may be, for example, material optical properties, geometries, ambient temperature and source temperature. The outputs of the ray tracing software module may be, for example, intensity and RMS angle distribution of all incident rays contacting the optical elements. Photometric design optimization system 100 will feed these parameters into the optical element sub-routine of the ray tracing software to determine angle adjustment on the filter transmission spectrum. According, photometric design optimization system 100 determines the tool responses utilized to calibrate the system at block 202.

At block 204, the transmittance spectra of optical elements in the database are uploaded into photometric design optimization system 100 via a user interface or some remote/local database. As described herein, the simulated optical elements may be a variety of candidate elements such as, for example, narrow band optical filters, ICEs and other system components. As understood in the art, transmittance spectra of the optical element base, is simply a N by M matrix with N being the number of candidate elements and M being the number steps in wavelength of interest, which is the same number of sampling points for each transmittance spectrum. The same data structure can be applied to candidate ICEs and other system components.

In certain exemplary embodiments, the simulated candidate optical elements will be commercially available optical elements from, for example, 400 nm to 5000 nm in increments of about 10 nm for each of 8 different bandwidths (0.9, 1.3, 2, 3, 4, 6, 9, and 13 percent center wavelength). The uploaded optical element data will include, for example, measured transmittance spectra of optical elements in one or more vendor's catalogue. In one embodiment, photometric design optimization system 100 constructs an array of Gaussian band pass transmission filters using a theoretical Gaussian shape modified for 80% transmission, for example. Gaussian filter functions may be created with, for example, +/−2.5 nm (5 nm range) normal distribution tolerances on filter center wavelength ("CWL") using randn( )*2.5+CWL adjustment to the band position.

At block 206, photometric design optimization system 100 generates the initial population of simulated optical elements by defining the population size and the maximum number of generations. In one embodiment, photometric design optimization system 100 selects the initial population from the database, and evolves a variable number (could be an open-ended number) of optical elements through generations. In an alternative embodiment, photometric design optimization system 100 may evolve a fixed number of optical elements through generations. Nevertheless, for a given optical element database, the binary string of each selected set of elements can be represented with respect to the total number of optical elements in the database or a fixed number of optical elements.

In those exemplary embodiments utilizing an open-ended number of simulated optical elements, the total N optical elements in the database are represented by N-bit binary code. The bit value is set to 1 when the corresponding optical element is selected and set to 0 if the corresponding optical element is not selected. Given the population size, in certain embodiments, photometric design optimization system 100 randomly selects the initial population of the optical element sets based on the software setting. Also, in certain embodiments, the anticipated number of optical elements to be used in each individual set, also called individual realization, is about 70% of the total candidates in the optical element base for example. The actual optical elements being selected in each individual realization will undergo change through evolutionary optimization. As will be understood by those ordinarily skilled in the art having the benefit of this disclosure, the variation among the optical element combinations in the final generation will be small if the process converges well, and re-selection with the reduced optical element base according to the frequency count of individual optical element presence during the multiple simulations and performance ranking might be needed depending on the problem.

Figure 2B:
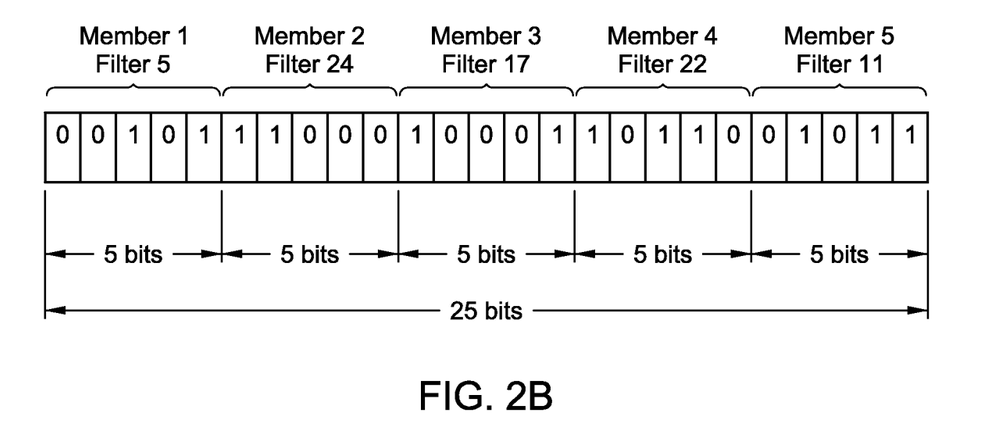
FIG. 2B illustrates a binary string representing five optical element selection from a thirty-two optical element database in accordance with certain exemplary embodiments of the present invention.

Still referring to block 206, in those exemplary embodiments utilizing a fixed number of simulated optical elements from the database, the element base has a size of $2^n$ and each element can be represented by a n-bit binary string, called a representative chromosome. For a combination of K optical elements, the chromosome length is n×K. To illustrate the concept, FIG. 2B shows an example of the chromosomes of a 5-filter combination (K=5) selected from a 32-filter base (n=5, $2^5$=32). As such, this embodiment can provide multiple solutions directly and efficiently with an expected number of combinations, and can be best applied to the cases where the maximum number of optical elements is a limiting factor for the specific downhole application. In certain instances, the optical element bases with sizes of 256, 512, 1024 and 2048 may be constructed respectively to meet the optimization requirement at the selected optical band. Moreover, in certain embodiments, a chromosome representing all candidate optical elements in the database may be utilized for preliminary optical element selection in order to locate the most probable optical element distribution, and the chromosome representing a fixed number of database optical elements may be utilized to refine the final selection.

Once the initial simulated optical element population has been generated at block 206, the algorithm then moves onto block 207 where photometric design optimization system 100 applies a genetic algorithm to perform global selection optimization in order to evaluate the entire candidate domain based upon one or more environmental factors, as further described below. In certain embodiments as described herein, the one or more environmental factors may be, for example, the optical element's response to a temperature, pressure or vibration variation. In certain other embodiments, global selection optimization is performed using a gradually size-reduced database. Ultimately, those optical elements selected will be environmentally rugged, thus resulting in a ruggedized photometric system.

At block 207, photometric design optimization system 100 first evaluates the performance of each simulated optical element using a fitness function at block 208. In certain exemplary embodiments, the fitness function is a multi-objective function as described below. Similar to regularization and cross-validation techniques utilized to avoid over-fitting in general predictive modeling, certain embodiments of the present invention improve optical element selection by not minimizing the root of mean-squared (RMS) error alone as an optimization criterion. For example, it is often observed that multiple Gaussian functions are highly overlapped or centered at the same wavelength after optimization using RMS based fitness functions. Therefore, although using overlapped optical elements can be justified for some spectrum analysis, certain embodiments of the present invention substitute overlapped optical elements with optical elements having a wider FWHM (Full Width at Half Maximum), while sacrificing little in performance.

To achieve this, certain embodiments of photometric design optimization system 100 add a penalty term onto the shortest distances in the CWL of selected optical elements when conducting performance measurements. In other words, photometric design optimization system 100 penalizes CWL overlap to improve the diversity of the selected optical elements. Here, such an exemplary objective function may be expressed as:

$$F = RMS + C/Min\_Dists, \quad \text{Eq. (2)}$$

where RMS is the root of mean-squared calibration error, Min_Dists is the averaged minimum distances in optical element CWL over the 3 to 5 elements having shortest distance in central wavelength, and C is a coefficient ranged from 0 to a positive real value depending on how RMS is calculated. Cases where C=0 are identical to using RMS alone, and selecting a positive C will increase the value of the objective function if the shortest distances of CWLs decrease, making it that optical element less likely to be selected. Accordingly, at block 208, photometric design optimization system 100 utilizes Equation (2) to evaluate the optical performance of each simulated element in the initial population, as would be understood by those ordinarily skilled in the art having the benefit of this disclosure.

At block 210, photometric design optimization system 100 determines whether the performance criteria for the simulated optical elements or the generational stop criteria have been satisfied. The performance criteria may be set utilizing a variety of methods such as, for example, a user-defined minimum fitness function value threshold. The stop criteria may be set to a predetermined limit such as, for example, 20 generations (i.e., a single pass around genetic algorithmic loop 207 is a generation). However, any number of generations may be selected as desired. If the determination is "no" with regards to either inquiry at step 210, photometric design optimization system 100 then applies the genetic operators (i.e., selection (step 212), crossover (step 214) and mutation (step 216)) to evolve selected optical elements, as will be readily understood by those ordinarily skilled in the art having the benefit of this disclosure.

To improve the robustness of the final optical element selection while generating the next population in algorithmic loop 207, certain embodiments of photometric design optimization system 100 evolve multiple environmental factors of the simulated optical elements such as, for example, light source stability, light source black body drift, detector noise and baseline drift tolerance, CWL drift tolerance, optical element transmittance change as a function of temperature, and nonlinear window effects (at block 208). In certain embodiments, this can be achieved by either treating variations under environment factors as different calibration sets and evaluating overall fitness based on the combined calibration set, or randomly introducing the variations through multiple generations, i.e., in each generation, slightly different calibration sets are used for fitness evaluation. Those ordinarily skilled in the art having the benefit of this disclosure will realize how this and other factors may be evolved.

Moreover, after block 216, certain other exemplary embodiments of photometric design optimization system 100 may also select optical elements that are not sensitive to a single number of latent vectors (with PLS) by searching/optimizing the optical element set over multiple latent vectors. In certain embodiments, the maximum number of the latent vectors ("MLV") can be set smaller than or equal to the number of calibration inputs (number of optical elements in this application) for PLS regression analysis. Note that in certain instances, using a large value of MLV may improve prediction on the training data, but also has high probability to over-fit the calibration model, making prediction on the new data less accurate. Also, if different MLV values are utilized, the solutions on optical element selection may vary.

In certain instances, the final selected optical element set might not be the best set with respect to the highest number of latent vectors, but it would be the best compromise or trade-off among different MLV values. To achieve this, certain embodiments of photometric design optimization system 100 introduce an additional loop into the performance measurement, at block 208, that has a different number of latent vectors each time, and takes the average or weighted sum for decision making, as will be understood by those ordinarily skilled in the art having the benefit of this disclosure.

Furthermore, in certain exemplary embodiments, after block 216, photometric design optimization system 100 will rank the simulated optical elements. Here, in certain exemplary embodiments, given a certain population of optical elements, photometric design optimization system 100 may only select a group of candidates (for example, the top 80%) and discard the rest, based upon their fitness function performance, to apply genetic operators for updating the design population in the next generation.

After block 216, the algorithm loops back to step 208 (i.e., genetic algorithmic loop 207), where photometric design optimization system 100 may add a number of elite optical elements randomly selected from a second or sub-population having optical characteristics similar to the first population, and again calculates the optical response of each. As such, algorithmic loop 207 continues to optimize the element selections until photometric design optimization system 100 determines either (1) that the performance criteria have been met or (2) that the defined number of generations has been performed (i.e., stop criteria) at step 210. Once photometric design optimization system 100 determines that the performance or stop criteria have been satisfied at step 210, the algorithm utilized in methodology 200 moves on to step 218, where the one or more simulated environmentally rugged optical elements that have been identified as meeting the performance criteria are output. The output may take a variety of forms, such as, for example, data displayed on a computer screen which identifies the simulated optical element from among those stored in the database or output as a textual report reflecting the same information. Thereafter, actual optical elements that correspond to the simulated optical elements are identified and/or fabricated and integrated into a fabricated photometric system. Accordingly, using computer simulation, exemplary embodiments of photometric design optimization system 100 will identify those optical elements most optimal for use in the defined downhole environment.

Note that optical element selection is often a conditional or local optimization problem due to the constraints in physical implementation, and, thus, photometric design optimization system 100 may ultimately output a small number of optical elements. Therefore, instead of pursuing convergence during the optical element selection optimization, certain embodiments of the present invention may utilize a relatively large population size (block 206) and relatively small generation number (block 210) to encourage the variations in multiple solutions and minimize the chance that optimal elements are omitted. Accordingly, the final optical elements output by photometric design optimization system 100 may be based on results ranking of multiple optical elements per their fitness function performance or the statistical distribution of a large number of simulations.

Figure 3:
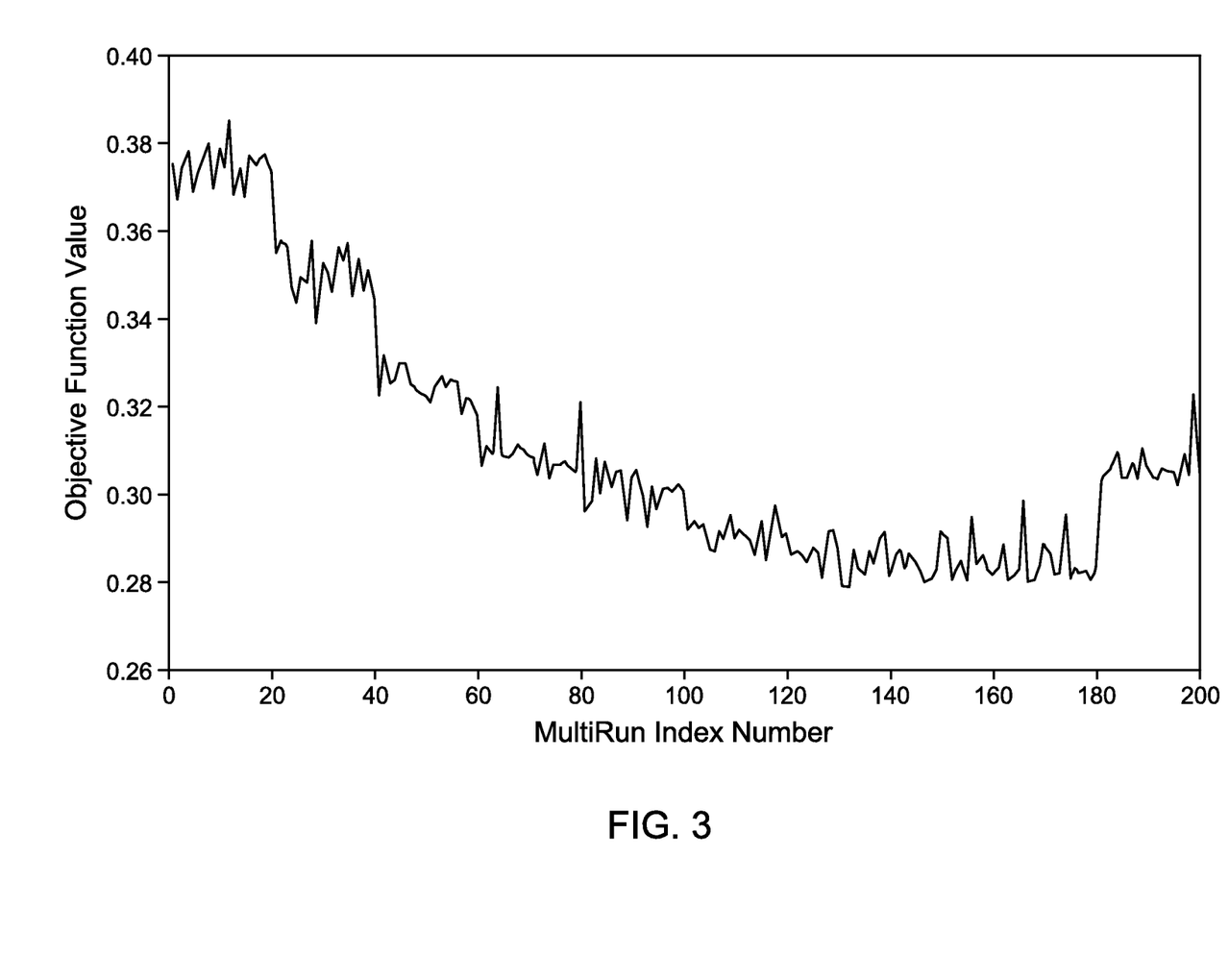
FIG. 3 is a graph illustrating a minimized objective function over multiple simulation runs using a gradually reduced optical element base, in accordance with certain exemplary embodiments of the present invention.

In certain exemplary embodiments, photometric design optimization system 100 utilizes the genetic algorithm to perform global selection optimization using a gradually size-reduced database of optical elements. FIG. 3 illustrates an exemplary trajectory of a minimized objective function during optical element selection with the size of the optical element base gradually reduced (i.e., global selection optimization). As shown, the Y axis plots the value of the objective function for a given parameter, while the X axis refers to the multi-run index number (for example, FIG. 3 plots 200 total runs). In this example, the optical element base uploaded at block 204 includes all optical element data stored therein. For example, starting from the use of a 1024-member optical element base, GA/PLS optimization has been applied several times (20 runs for example) with different random initializations first with the same GA operational parameter setting (population size and generation number), then auto-switched to a smaller optical element base derived from the previous cycle by removing the least selected portion of optical elements and run multiple simulations again to minimize initialization effect. The routine is repeated, and after 180 runs (optical element base reduced 9 times with 20 runs in each reduction), for example, the objective function reached its minimum point and the size of optical element base is reduced to 30~40. Ultimately, the optimized optical element base includes the most promising optical element candidates for the given application, and can be used as either a final optical element set if no limit has been imposed for system implementation, or a solid resource for further refinement with a fixed number approach based on the tool constraints.

Figure 4:
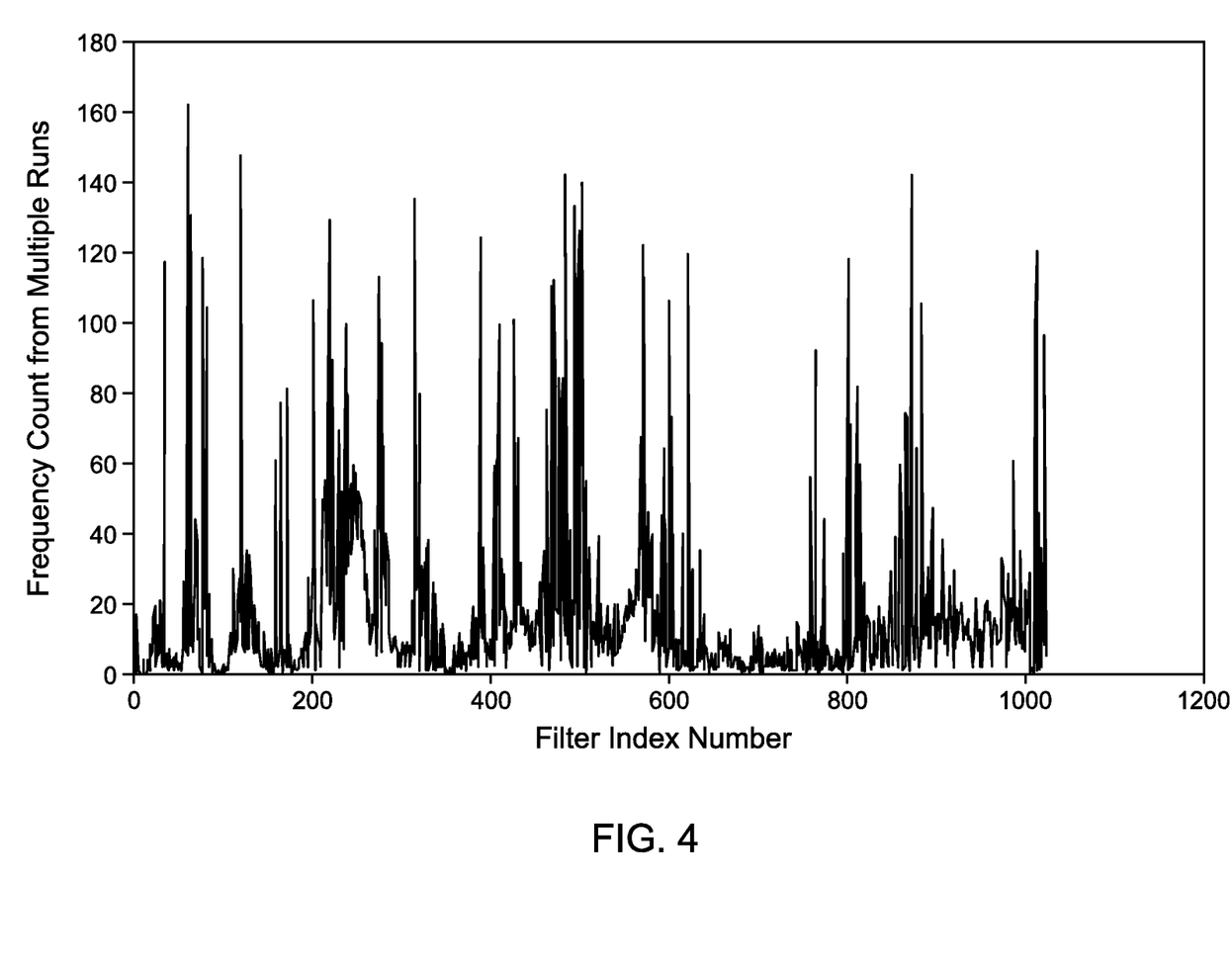
FIG. 4 is a graph illustrating a histogram of the accumulated frequency count of each simulated optical element of FIG. 3 during the selection process, in accordance with certain exemplary embodiments of the present invention.

FIG. 4 illustrates a histogram that plots the accumulated frequency count of each optical element over the whole process of global selection optimization. As with FIG. 3, in this example, the optical element base uploaded at block 204 includes all optical elements (from 1 to 1024, for example, as indicated by the optical element index in FIG. 4) in original optical element base stored therein. For the total of 180 simulation runs, for example, some optical elements are selected more than 100 times as shown in its frequency count in FIG. 4. Some others are only selected a small number of times, and some optical elements may not be selected at all over entire process. The final optical element set (30~40 optical elements, for example) retained in the reduced optical element base only includes the optical elements with the highest frequency count in the histogram. All others are removed through evolutionary selection. Note that the optimal optical elements, identified by the frequency spikes as winning optical elements, still constitute an adequate base which covers a wide range in transmittance spectra and can provide flexibility for further calibration transfer and final refinement.

The exemplary embodiments described herein may be utilized to select environmentally rugged narrow band optical filters, ICEs, or a combination of narrow band filters and ICEs. As understood in the art, typically, commercial narrow band optical filters are used for general purpose calibration analysis during the selection optimization phase, i.e., the sample optical response through the selected filter sets can be used to predict multiple fluid properties via calibration models. ICEs are typically designed as predictors for particular compositional analysis such as ICE/Saturates, ICE/Aromatics, ICE/Asphaltenes and ICE/GOR. However, since candidate ICEs also possess the features of multi-band-pass or single-band-pass filters, they can be used in one exemplary embodiment as part of a reduced filter database to refine the final selection for tool system implementation. The refinement can be the optimization of conditional element selection in one embodiment, i.e., by including particular ICE elements in the final set and determining what other optical filters need to be added—also referred to as conditional selection optimization. Moreover, conditional selection optimization may also be utilized with a fixed number of combinational filter/ICE elements in each output. In other embodiments, this refinement can also be performed by treating all reduced narrow band filters and ICEs equivalently and determining the best final set based on the linear or nonlinear calibration analysis with the selected optical response of each channel as input, no matter whether it is from the narrow band filter or ICE, as will be understood by those ordinarily skilled in the art having the benefit of this disclosure.

Moreover, in certain embodiments, although it may be preferred to perform combinational filter/ICE selection based on the reduced size of simulated candidate elements, either at the stage of final design refinement or at the stage after fabrication to compensate manufacturing effect, there is no limit to make combinational element selection at the early phase of selection optimization, as described herein, by uploading both the narrow band optical filter database and ICE database into photometric design optimization system 100. The advantage of using combinational elements may be to improve system reliability by reducing the total number of system components. For example, more than 20 single-band optical filters may be necessary to predict the given set of multiple fluid properties, but can achieve the same or better prediction accuracy by using a smaller number of filter/ICE combinations because of the inherently integrated multi-band features of ICE.

Accordingly, through utilization of the present invention, high diversity in selected optical elements for a given photometric system design can be cost-effectively controlled and achieved by a) selecting suitable genetic algorithmic operational parameters to make optimization less convergent; b) adding elite designs from the second randomly generated population to the first (primary) population in each generation; and c) outputting ranked optical elements based upon fitness function performance.

Accordingly, the present invention provides a platform by which to efficiently ruggedize photometric system for use in a variety of applications such as, for example, optical fluid identification tools for downhole and surface applications. The exemplary embodiments described herein provide a number of advantages. First, the present invention drastically reduces the computational requirement when compared to conventional approaches. For example, the present invention may only output 4000-8000 optical elements to find the optimal solution, in stark contrast to the roughly 100,000 plus designs produced using conventional design methods. Second, the present invention provides a simplified computational algorithm, thus reducing the associated computing requirement. As described herein, exemplary embodiments of the present invention utilize an efficient genetic algorithm, instead of the complex and computing-resource taxing gradient-based multivariate search method of existing approaches.

Third, the present invention provides a drastic reduction in computing power and computational cost. For example, the present invention may be easily carried out on a single PC or notebook computer over the course of 3-4 hours. In contrast, conventional methods require a 15-node computer cluster to simulate the 100,000 designs and remove redundant designs over the course of 10-12 hours. Accordingly, the present invention only requires 1/10 of the computational resources of existing approaches and, hence, 1/10 of the cost.

The foregoing methods and systems described herein are particularly useful in designing photometric systems for use in wellbores. As described, the system utilizes a genetic algorithm to optimize the selection of optical elements based upon one or more environmental factors, thereby providing a more robust and ruggedized photometric system. In one exemplary application, once the selection of the optimal ruggedized optical elements has been made through computer simulation, an actual photometric system is then fabricated using those simulated optical elements and positioned downhole or as part of a downhole assembly to perform monitoring or sensing operations. In another application, optical elements matching those simulated and selected by the system may be fabricated and incorporated into a photometric system.

An exemplary methodology of the present invention provides a method to design a photometric system, the method comprising generating a population of simulated candidate optical elements; and utilizing a genetic algorithm to select at least one of the simulated candidate optical elements based upon one or more environmental factors, the selected simulated candidate optical elements being environmentally rugged optical elements to be utilized within a photometric system. In another method, the one or more environmental factors are a response of the simulated candidate optical elements to at least one of a temperature, pressure or vibration variation. In yet another, utilizing the genetic algorithm further comprises utilizing a multi-objective fitness function to determine the environmentally rugged optical elements. In another, utilizing the multi-objective fitness function further comprises penalizing filter central wavelength overlap to improve the diversity of the rugged optical elements.

In another exemplary method, utilizing the genetic algorithm further comprises ranking the simulated candidate optical elements based upon a fitness function performance. In another, utilizing the genetic algorithm further comprises continuing to utilize the genetic algorithm to select the simulated candidate optical elements based upon one or more environmental factors until a maximum number of generations have been simulated or a performance criteria has been met. In yet another, the environmentally rugged optical elements are at least one of an optical filter or an Integrated Computational Element. In another, the environmental factors of the simulated candidate optical elements comprise at least one of light source stability, detector noise tolerance or filter transmittance change as a function of temperature.

In another exemplary method, utilizing the genetic algorithm further comprises performing global selection optimization using a gradually size-reduced database of simulated candidate optical elements. In another, utilizing the genetic algorithm further comprises performing conditional selection optimization using a fixed number of simulated candidate optimal elements in each output, the candidate optical elements being a combination of optical filters and Integrated Computational Elements. Yet another method further comprises fabricating the selected simulated candidate optical elements or fabricating a photometric system using the fabricated simulated selected candidate optical elements.

Another exemplary methodology of the present invention provides a method to design a photometric system, the method comprising utilizing a genetic algorithm to select an optical element based upon one or more environmental factors, thus identifying one or more environmentally rugged optical elements. In another method, utilizing the genetic algorithm to select the optical element further comprises utilizing a fitness function to identify the one or more environmentally rugged optical elements. Yet another method further comprises fabricating a photometric system using the one or more environmentally rugged optical elements.

Furthermore, the exemplary methodologies described herein may be implemented by a system comprising processing circuitry or a computer program product comprising instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method to design a photometric system, the method comprising:
    selecting an initial population of simulated candidate optical elements, wherein the optical elements are optical filters and/or Integrated Computational Elements (ICE) of the photometric system configured to be disposed within a downhole environment;
    determining one or more base environmental factors associated with the downhole environment;
    evolving the one or more base environmental factors associated with the downhole environment to one or more evolved environmental factors associated with the downhole environment;
    applying an evolutionary algorithm comprising the one or more evolved environmental factors to evaluate the one or more of the simulated candidate optical elements, where applying the evolutionary algorithm further comprises utilizing a multi-objective fitness function,
    wherein utilizing the multi-objective fitness function comprises determining central wavelengths of the simulated candidate optical elements and penalizing central wavelength overlap among the simulated candidate optical elements; and
    selecting at least one of the simulated candidate optical elements in response to the applying the evolutionary algorithm, the selected simulated candidate optical elements being environmentally rugged optical elements to be utilized within the photometric system.

2. A method as defined in claim 1, further comprising:
    applying the evolutionary algorithm comprising the one or more base environmental factors to one or more of the simulated candidate optical elements, wherein the one or more evolved environmental factors are evolved in response to reaction of the simulated candidate optical elements to at least one of a temperature, pressure or vibration variation.

3. A method as defined in claim 1, wherein the applying the evolutionary algorithm further comprises ranking the simulated candidate optical elements based upon a fitness function performance.

4. A method as defined in claim 1, wherein the applying the evolutionary algorithm further comprises continuing to apply the evolutionary algorithm until a maximum number of generations have been simulated or a performance criteria has been met.

5. A method as defined in claim 1, further comprising:
    evolving at least one of the simulated candidate optical elements in response to the applying the evolutionary algorithm.

6. A method as defined in claim 1, wherein the environmental factors of the simulated candidate optical elements comprise at least one of:
    light source stability;
    detector noise tolerance; or
    filter transmittance change as a function of temperature.

7. A method as defined in claim 1, wherein the applying the evolutionary algorithm further comprises performing global selection optimization using a gradually size-reduced database of simulated candidate optical elements.

8. A method as defined in claim 1, wherein the applying the evolutionary algorithm further comprises performing conditional selection optimization using a fixed number of simulated candidate optimal elements in each output.

9. A method as defined in claim 1, further comprising:
    fabricating the selected simulated candidate optical elements; or
    fabricating the photometric system using the fabricated simulated selected candidate optical elements.

10. A system comprising a controller configured to perform any of the methods in claims 1-8.

11. A non-transitory machine-readable medium comprising instructions which, when executed by at least one processor, causes the processor to perform any of the methods in claims 1-8.

12. A method as defined in claim 1, further comprising:
    evolving at least one of the initial population of simulated candidate optical elements during the applying the evolutionary algorithm.

13. A method as defined in claim 1, wherein the evolving the one or more environmental factors comprises:
    randomly introducing variations within at least one of the base environmental factors.

14. A method as defined in claim 1, wherein the evolutionary algorithm is a genetic algorithm, and wherein the method further comprises:
    evolving the one or more evolved environmental factors associated with the downhole environment to one or more further evolved environmental factors associated with the downhole environment after the selecting the simulated candidate optical elements;
    applying a second evolutionary algorithm comprising the one or more further evolved environmental factors to evaluate the one or more selected simulated candidate optical elements; and
    further selecting at least one of the selected simulated candidate optical elements in response to the applying the second evolutionary algorithm.

* * * * *